United States Patent [19]

Fleischer

[11] 4,188,926

[45] Feb. 19, 1980

[54] AUTOMOTIVE INTERNAL COMBUSTION ENGINE SERVO CONTROL SYSTEM, PARTICULARLY FOR AUTOMATIC SPEED CONTROL ARRANGEMENT

[75] Inventor: Helmut Fleischer, Schwieberdingen, Fed. Rep. of Germany

[73] Assignee: Robert Bosch GmbH, Stuttgart, Fed. Rep. of Germany

[21] Appl. No.: 964,293

[22] Filed: Nov. 28, 1978

Related U.S. Application Data

[63] Continuation of Ser. No. 770,594, Feb. 22, 1977, abandoned.

[30] Foreign Application Priority Data

Feb. 22, 1976 [DE]  Fed. Rep. of Germany ....... 2609842

[51] Int. Cl.² .............................................. F02P 5/04
[52] U.S. Cl. ................................. 123/102; 123/117 R
[58] Field of Search ................ 123/102, 97 R, 117 R, 123/103 E, 198 D, 32 EH, 32 EI, 32 EE; 364/118, 431; 361/51; 60/285, 276

[56] References Cited

U.S. PATENT DOCUMENTS

| 2,971,596 | 2/1961 | Davis et al. | 123/102 |
|---|---|---|---|
| 3,070,185 | 12/1962 | Fales | 123/102 |
| 3,116,807 | 6/1964 | Wilson | 123/102 |
| 3,182,648 | 5/1965 | Schneider et al. | 361/51 |
| 3,192,382 | 6/1965 | Allison | 123/102 |
| 3,547,216 | 12/1970 | Marie | 123/102 |
| 3,575,256 | 4/1971 | Jania | 123/97 R |
| 3,648,798 | 3/1972 | Jania | 123/102 |
| 3,984,976 | 10/1976 | Nagai | 60/285 |
| 3,998,189 | 12/1976 | Aoki | 60/276 |
| 4,016,843 | 4/1977 | Dorrego | 123/117 R |

*Primary Examiner*—Charles J. Myhre
*Assistant Examiner*—R. A. Nelli
*Attorney, Agent, or Firm*—Frishauf, Holtz, Goodman & Woodward

[57] ABSTRACT

A servo control system is used to supply a command position signal to control the throttle opening of the engine, and hence vehicle speed. To permit increase of amplification without instability of the positioning control loop when sensing throttle position and feedback of the throttle position error signal, the feedback signal is degressively nonlinearly related to absolute throttle position in order to match the nonlinear throttle position-torque characteristics of automotive type internal combustion engines. The non-linear relation is obtained with a minimum of external connections by connecting a resistor to a source of fixed supply which is connected to the slider of a potentiometer having one terminal unconnected and the other terminal connected to ground or chassis. Only two supply lines to the throttle positioning sensor are needed, namely one for the resistor to a source of supply and the other for the variable resistor take off from the slider.

4 Claims, 5 Drawing Figures

EQUATION : $U_r = \dfrac{R_x}{R81 + R_x}$

AUTOMOTIVE INTERNAL COMBUSTION ENGINE SERVO CONTROL SYSTEM, PARTICULARLY FOR AUTOMATIC SPEED CONTROL ARRANGEMENT

This is a continuation, of application Ser. No. 770,594, filed Feb. 22, 1977 now abandoned.

Reference to related applications assigned to the assignee of the present invention: U.S. Serial 770,585, filed February 22, 1977, now U.S. Pat. No. 4,120,373 Fleischer U.S. Serial 770,595, filed February 22, 1977, Fleischer et al. now Patent 4,117,903.

The present invention relates to an automotive internal combustion engine servo control system and more particularly to such servo control systems for use in automatic speed control arrangements.

Automatic speed control arrangements customarily include a command signal source to determine, or effect a certain commanded speed, a source providing output signals representative of actual speed of the vehicle and a controller, typically acting on the throttle of the engine to adjust the position of the throttle so that the actual speed of the vehicle with which the engine is used will be the commanded speed. The throttle itself is preferably controlled by a servo control loop in which the throttle position is sensed, a corresponding throttle position signal is derived and fed back within the throttle position loop by providing a feed back, error signal.

The signal source to provide an output signal representative of the angular position of the throttle usually is a potentiometer which is directly coupled to the electrical network of a motor vehicle, and mechanically connected to the throttle. Upon change of throttle position, the slider, or tap point of the potentiometer is changed, so that the voltage derived from this position indicator will be linearly representative of the position of the throttle. This voltage is then fed back within the throttle position determining loop circuit.

It has been found in actual practice that such a system does not meet requirements regarding stability and amplification under all operating conditions. If the feedback of the signal is low, and the amplification within the throttle position control loop is high, small changes in position of the throttle will cause instabilities in the control circuit; if, on the other hand, the feed back of the throttle position is high and a lower amplification obtained within the loop, deviations from desired throttle positions may exceed desired values.

It is an object of the present invention to improve the stability of the control loop in a simple manner without decreasing amplification of the control loop.

Subject Matter of the Present Invention: Briefly, deviation of throttle position is matched to overall performance of the engine. In accordance with the invention, this is based on the discovery that changes in angular position of the throttle will cause a greater increase in torque delivered by the engine when the engine operates at a low speed than when the engine operates at a high speed. Thus, the amplification of the throttle positioning control loop changes in dependence on the throttle position and in dependence on speed of the engine. The torque of the usual automotive-type internal combustion engine, and typically of the gasoline-powered internal combustion engine does not change linearly with position of the accelerator pedal, or, respectively, position of the throttle, but rather is additionally dependent on other parameters, and most importantly of speed. Accordingly, in accordance with the invention, to match deviation of throttle position to performance of the engine, the signal generator providing the actual position signal of the throttle is so arranged that the output signal depends on the actual throttle deflection, and decreases, proportionately, as the throttle opening increases. A wider open throttle, of course, means higher engine speed.

The system in accordance with the present invention thus provides for compensation of the effect of dependence of a given change in throttle position on the then existing absolute throttle position. The fed back error voltage is so matched that in a range of small throttle openings, that is, of small absolute throttle deflection angles, a predetermined change in angular position, that is, a predetermined deflection angle from the absolute angle will result in a fed back voltage signal which is greater than when the absolute throttle position is wider, that is, when the throttle is more extensively deflected. By suitable dimensioning and mutual matching of the elements and components of the system, a constant, uniform loop amplification can be obtained while, simultaneously, providing optimum stability to the control loop itself.

In accordance with a feature of the invention, the non-linear throttle position—feedback signal relationship can be easily realized by constructing the actual position transducer, or generator in form of a fixed resistor and a variable resistor, in which the variable resistor is coupled to the throttle. The fixed resistor is coupled to the tap, or slider of the variable resistor and the feedback voltage is picked off the common junction of both resistors.

The foregoing solution additionally permits decreasing the wiring requirements for the system by one line, which results in substantial savings in installation costs since, usually, the throttle position in the transducer is located at positions on the engine, or carburetor which is difficult to reach.

The variable resistor can be instrumented either by a continuously variable potentiometer, one of the end terminals of which remains disconnected; or by a resistance network. Resistance networks made in thick film technology can currently be made in comparatively inexpensive manner and have high reliability. When using a potentiometer, the dimensions of the resistance elements can easily be changed to obtain a desired voltage-position transfer relationship, matched to the engine, so that the desired transfer relationship can be easily achieved.

The invention will be described by way of example with reference to the accompanying drawings, wherein.

Figure 1:
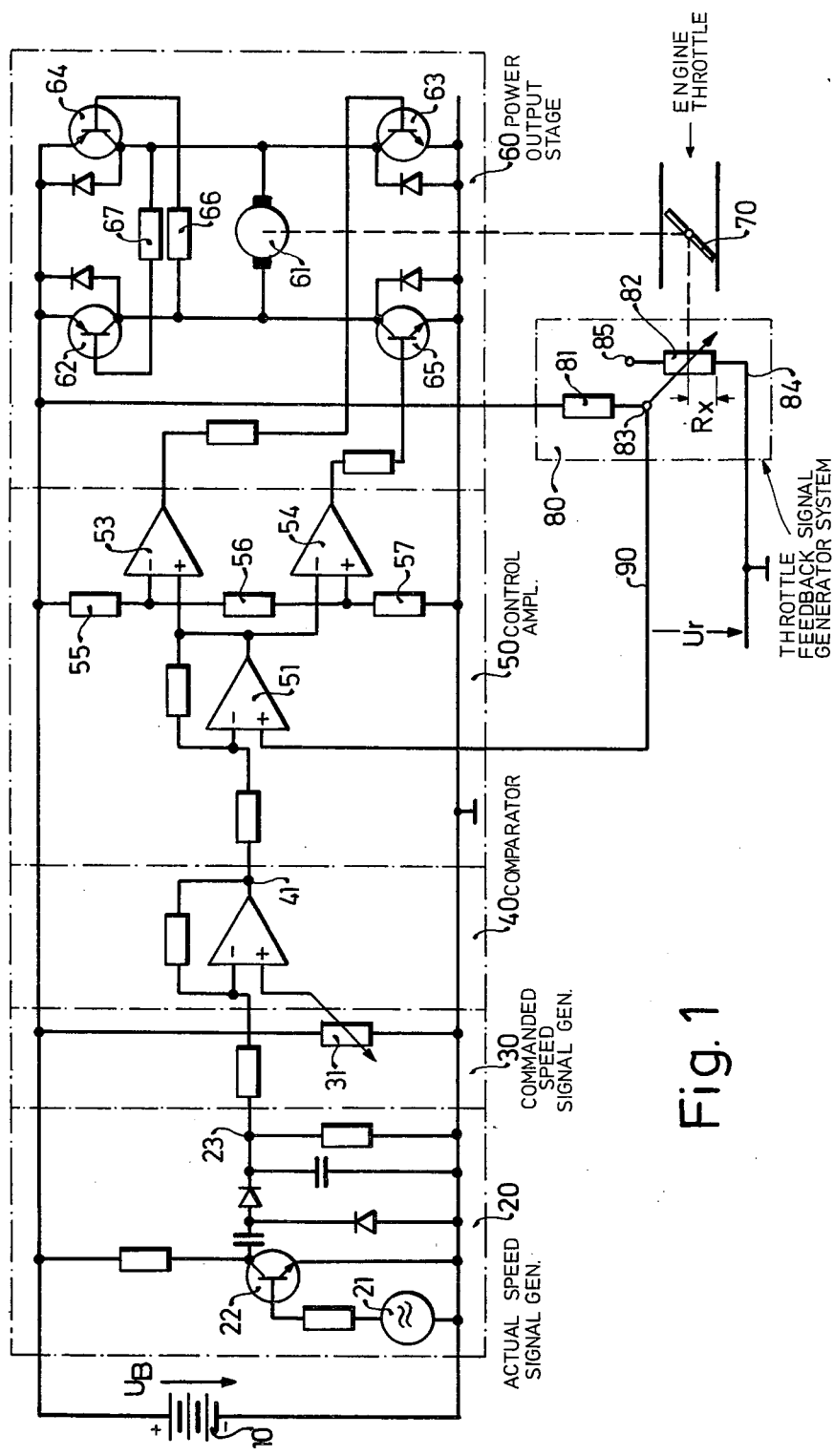
FIG. 1 shows a general schematic circuit diagram of the overall speed control system.

A battery 10, which typically is the battery of the vehicle, or maybe a controlled voltage power supply fed by the battery is used to supply the circuit with electrical energy. An actual speed generator 20 includes a speed transducer 21 which provides an alternating output voltage periodically controls switching transistor 22 to change between conductive and saturated state. The square wave voltage derived from transistor 22 is connected through a pumping circuit to form an integrated dc output voltage, available at terminal 23, the level of which corresponds to the speed with which the speed transducer 21 is operated. The voltage at terminal 23 is representative of actual speed of the vehicle and forms the actual speed signal.

A command speed signal generator 30 is provided, shown schematically as a potentiometer 31, which can be set to a predetermined speed. Other speed command systems may be used, for example as described in cross-referenced application Ser. No. 770,595 filed Feb. 22, 1977, now U.S. Pat. No. 4,117,903 by the inventor hereof. The commanded speed signal and the actual speed signal are compared in a comparator 40, constructed as a operational amplifier, which provides at its output 41 an output control or speed error signal for a subsequent throttle positioning system. The throttle positioning system includes a control amplifier 50, a power output stage 60, and an engine throttle 70, the position of which is changed by a motor 61 of the power output stage 60. The control amplifier 50 includes a first operational amplifier 51 which controls two further operational amplifiers 53, 54 in such a manner that either one, or neither, but not both together can supply output signals at any one time. The direct input of operational amplifier 53 as well as the inverting input of operational amplifier 54 are connected to the output of the first operational amplifier 51; the inverting input of operational amplifier 53 and the direct input of operational amplifier 57 are respectively connected to different tap points of the voltage divider formed by three resistors 55, 56, 57 connected between the positive and negative buses of the supply source to clamp the voltages of the terminals connected to the operational amplifiers to predetermine values.

The power stage 60 includes motor 61 which is controlled by a bridge-supplied 4-transistor controlled circuit. Motor 61, preferably is a permanent magnet dc positioning motor. The positioning system including motor 61 and the respective transistors 62-65 are wellknown. If operational amplifier 54 provides a positive signal, transistor 65, having its base directly connected to the operational amplifier 54 is rendered conductive; over resistor 66, transistor 64 will likewise be rendered conductive. Operational amplifier 53, when providing a positive output signal, commands conduction of transistor 63 and, through resistor 67, of transistor 62.

Rotation of motor 61, controlled by conduction of the relative transistor pairs 64, 65 or 62, 63, respectively causes a change in position of the engine throttle 70 and hence a change in speed of the vehicle driven by the engine.

The actual position of the throttle 70 is sensed by a throttle feedback signal generator system 80. The feedback signal generator system 80 includes a fixed resistor 81 and a variable resistor 82, coupled to the throttle as indicated by the broken line and having a resistance which changes with change of the throttle position. The connection is so made that the fixed resistor 81 is connected to the supply bus with one terminal and, with the other terminal, to the tap or slider 83 of the variable resistor 82. The other terminal 84 of resistor 82 is connected to ground. The free terminal 85 of resistor 82 is left free and unconnected. The junction or connection 83 then will have a voltage Ur appear thereat which is connected through line 90 to the input of operational amplifier 51 as a feedback error signal. The main control system thus has an auxiliary control loop connected in cascade therewith, and forming a subsystem or subcontrol loop thereof, to accurately determine and set the position of the engine throttle.

Operation: Output 41 will have a signal appear thereat which depends on the magnitude and direction of deviation of actual speed from commanded speed. The signal is obtained in comparator 40 and is a signal representative of the change of deflection of the engine throttle 70 to restore actual speed to commanded speed. This signal forms the command signal for the cascaded subcontrol loop, which is compared in control amplifier 50 with the actual position of the throttle, as determined by the voltage Ur which is representative of actual angular of the engine throttle and fedback to the operational amplifier 51.

Figure 2:
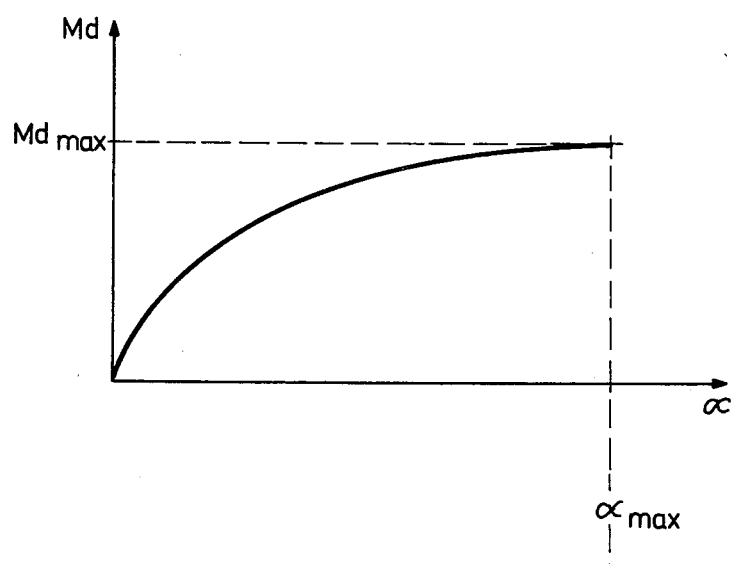
FIG. 2 shows a diagram in which the torque of an Otto-type internal combustion (IC) engine (abscissa) with respect to throttle deflection angle.

FIG. 2 clearly shows the nonlinear relationship between torque $M_d$ and angular position of throttle 70, $\alpha$. In small speed ranges, that is, at low torque, small deflection of the throttle and hence small deflection of accelerator pedal will cause a substantial change in torque. A small increase in the opening of the throttle will result in a high increase in torque. In this range, the control loop amplification, overall, is high. This may result in uncontrolled, undesired nonlinearity and particularly in controlled loop oscillations; particularly if the vehicle is operating on a downhill slope since then the angular throttle position of throttle 70 is very small.

Figure 3:
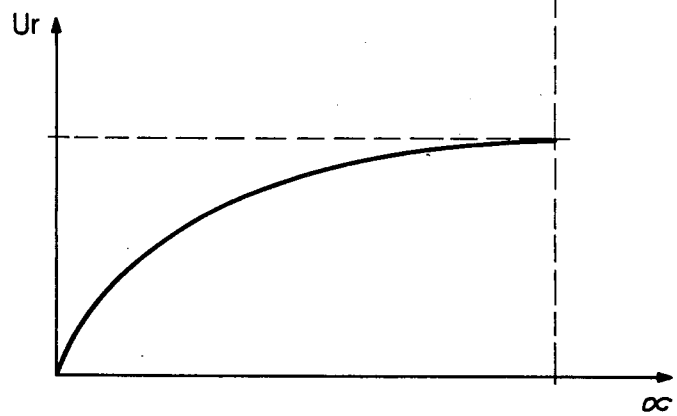
FIG. 3 shows a diagram of feedback error voltage (abscissa) with respect to throttle deflection angle.

The voltage Ur which is fedback can readily be determined mathmatically by equation 1 reproduced on sheet 2 of the drawings, in which Rx is the value of the resistance at an instantaneous throttle position, as schematically indicated on FIG. 1. FIG. 3 illustrates the relationship between the feedback Ur and the throttle deflection angle $\alpha$, and clearly shows the degressive relationship. By suitable matching of resistance values; the degressive relationship can be so arranged that it approximately matches the torque-throttle deflection curve, as can clearly be seen by comparing FIGS. 2 and 3. As a result, a substantially higher voltage change is fedback to comparator operational amplifier 51 when the absolute deflection angle of the throttle is low then when the absolute deflection angle is already high. Such a throttle angle position dependent feedback, which is nonlinear, permits the use of a uniform, constant loop amplification within the amplifier system of amplifier 50 and power output stage 60, independent of the angular position of the throttle itself. This permits increasing the loop amplification over that otherwise possible and known, without introducing instabilities into the control loop.

In accordance with a feature of the invention, the variable resister 82, which is usually located in the engine compartment of a motor vehicle in positions of impeded access, requires only the connection of two wires, or connecting lines, one terminal of the resistor 82 being connected to ground, or chassis of the vehicle thus not requiring a separate wire line. In previously proposed systems, three lines were required; 2 wires substantially decrease the cost of wiring and installation of the system.

Figure 1A:
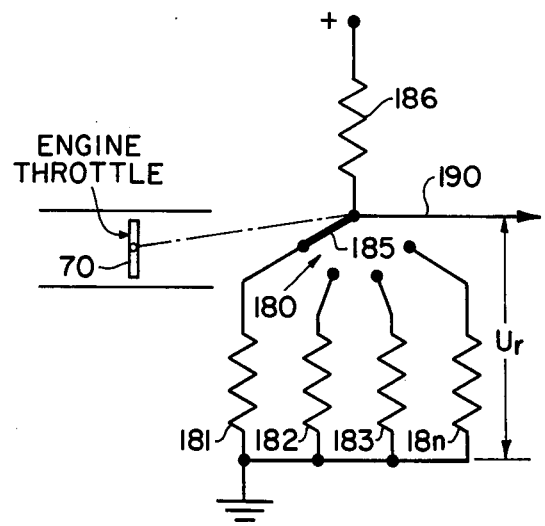
FIG. 1a shows a fragmentary portion of the diagram of FIG. 1, illustrating a modification.

FIG. 1a shows a modification in which the throttle 70 is coupled to a throttle position network 180 including a group of resistors 181, 182, 183 . . . 18n, selectively energized by means of a switch 185 coupled to throttle 70 through a resistor 186 connected to the positive bus of the battery 10. The voltage Ur is taken off 190 and fedback to operational amplifier 51, similar to the feedback from line 90 in FIG. 1. The respective resistance values are so arranged that, upon change of position of the throttle, resistors of such values are connected by the switch 185 that the non-linear resistance relationship versus angular position of throttle 70 is obtained which is illustrated in FIG. 3.

In a typical example, and using a nominal supply voltage of 10 v, resistor 82 (FIG. 1) had a maximum resistance value of 10 K ohms, the slider position-resistance relationship was uniform, and resistor 81 had a value 9.1 K ohms. This provided an output curve similar to that of FIG. 3 and is suitable, for example, for use in spark ignition engines.

Figure 1B:
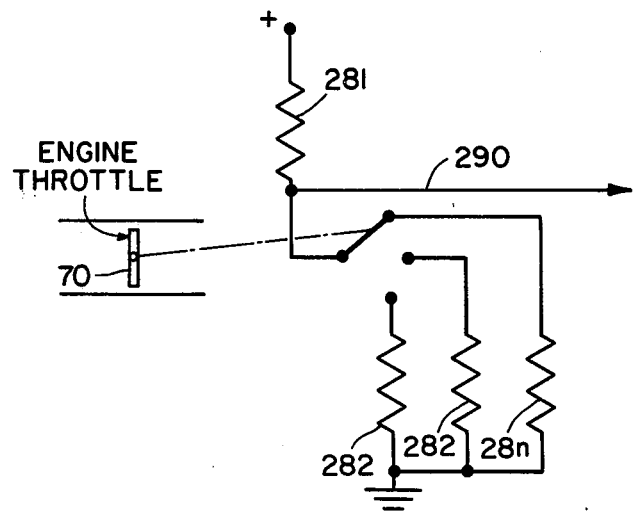
FIG. 1b shows another fragmentary diagram illustrating yet another modification.

FIG. 1b illustrates another modification; a resistor 281 is connected to the positive bus, similar to resistor 81. It is connected to the switch blade of a switch 285 which is coupled to the throttle (70) as schematically indicated by the chain dotted line and which, in dependence on the position of the throttle 70 is connected to respective ones of resistors 282, 283 ... 228n. The output voltage is derived from line 290, corresponding to line 90 of FIG. 1 and applied to operational amplifier 51.

Various changes and modifications may be made within the scope of the inventive concept.

I claim:

1. In an automotive vehicular internal combustion engine speed servo control system having
   an engine speed control loop under control of a command input including
   an actual speed signal generator (20) coupled to the engine and providing an actual speed signal;
   a command speed generator (30) subject to said command and providing a command speed signal;
   comparator means (40) comparing said speed signals and providing a speed error signal;
   motor means (61) coupled to the throttle (70) of the engine, controlling its position;
   a control amplifier and power means (50, 60) responsive to the speed error signal and connected to the motor means (61) to control its operation and thereby the position of the throttle (70);
   a throttle feedback signal generator system (80) coupled to the throttle (70) and having an electrical output coupled to and fed back to the control amplifier power means (50, 60) and providing an actual throttle position signal thereto
   and means to compensate for non-linearities in throttle deflection vs. engine speed change characteristics over the range of operating speed of the engine;
   comprising
   a source of voltage (10) and
   a nonlinear variable resistance means (81, 82, 83, 181, 182, 183 ... 18n, 185, 186) electrically coupled to the source (10) and mechanically coupled to the throttle (70) and linearly displaced in accordance with the movement of the throttle, said nonlinear variable resistance means having a nonlinear throttle displacement variation versus resistance variation relationship in which a given throttle displacement results in a resistance variation which, at small throttle openings, is greater than at larger throttle openings, and providing a feedback output voltage which thus is nonlinearly degressive with respect to linearly increasing opening position of the throttle (70) and to provide for linear response of the control loop throughout the range of operating speed of the engine 2. System according to claim 1 wherein the throttle feedback generator system (80) comprises a fixed resistor (81) and a variable resistor (82) coupled to the throttle (70), the fixed resistor (81) having one terminal coupled to the variable or slider position of the variable resistor (82) to form a common junction (83) therewith, said common junction providing the throttle feedback signal (Ur) coupled back to the control amplifier.

3. System according to claim 1 wherein the throttle feedback signal generator system (80) comprises a switchable resistance network (181, 182, 183 ... 18n) and a switch (185) coupled to the throttle (70).

4. System according to claim 2 wherein the variable resistor comprises a potentiometer (82) having one terminal (85) free, or unconnected.

* * * * *

UNITED STATES PATENT AND TRADEMARK OFFICE
CERTIFICATE OF CORRECTION

PATENT NO. : 4,188,926

DATED : February 19, 1980

INVENTOR(S) : Helmut FLEISCHER

It is certified that error appears in the above—identified patent and that said Letters Patent are hereby corrected as shown below:

FOREIGN APPLICATION PRIORITY DATA

March 10, 1976[DE] Fed. Rep. of Germany .....2609842

Signed and Sealed this

Eighth Day of July 1980

[SEAL]

Attest:

SIDNEY A. DIAMOND

Attesting Officer     Commissioner of Patents and Trademarks